United States Patent [19]

Pannenbecker

[11] 4,201,741

[45] May 6, 1980

[54] BLOWN FILM PROCESS

[76] Inventor: Heinrich Pannenbecker, Siebengebirgstr. 53, 5300 Bonn-Holzlar, Fed. Rep. of Germany

[21] Appl. No.: 938,773

[22] Filed: Sep. 1, 1978

[30] Foreign Application Priority Data

Sep. 9, 1977 [DE] Fed. Rep. of Germany ....... 2740629

[51] Int. Cl.² ............................................. B29D 23/04
[52] U.S. Cl. .................................. 264/40.1; 264/40.2; 264/40.3; 264/40.6; 264/565; 264/566; 425/72 R; 425/140; 425/326.1
[58] Field of Search ............... 264/566, 565, 564, 569, 264/40.2, 40.4, 40.6, 40.1, 40.3; 425/140, 143, 72, 326.1

[56] References Cited

U.S. PATENT DOCUMENTS

| 3,307,218 | 3/1967 | Reifenhauser | 425/72 |
| 3,355,770 | 12/1967 | Augustin | 425/326.1 |
| 3,400,184 | 9/1968 | Matsuo et al. | 264/40.6 |
| 3,932,080 | 1/1976 | Uemura et al. | 425/140 |
| 4,101,614 | 7/1978 | Havens | 264/569 |
| 4,140,460 | 2/1979 | Carlsen | 425/140 |

Primary Examiner—Jeffery R. Thurlow
Attorney, Agent, or Firm—Spensley, Horn, Jubas & Lubitz

[57] ABSTRACT

In a blown film process for manufacturing plastic film bags, the shape of the film bag being formed is dynamically controlled by sensors provided at specific locations. At these locations, any deviation of the bag shape from the ideal shape will result in significant differences in quality of the produced film bag, or may result in a break of the film bag. Such deviation in shape is prevented by using the output signals from the sensors to control various process parameters.

18 Claims, 5 Drawing Figures

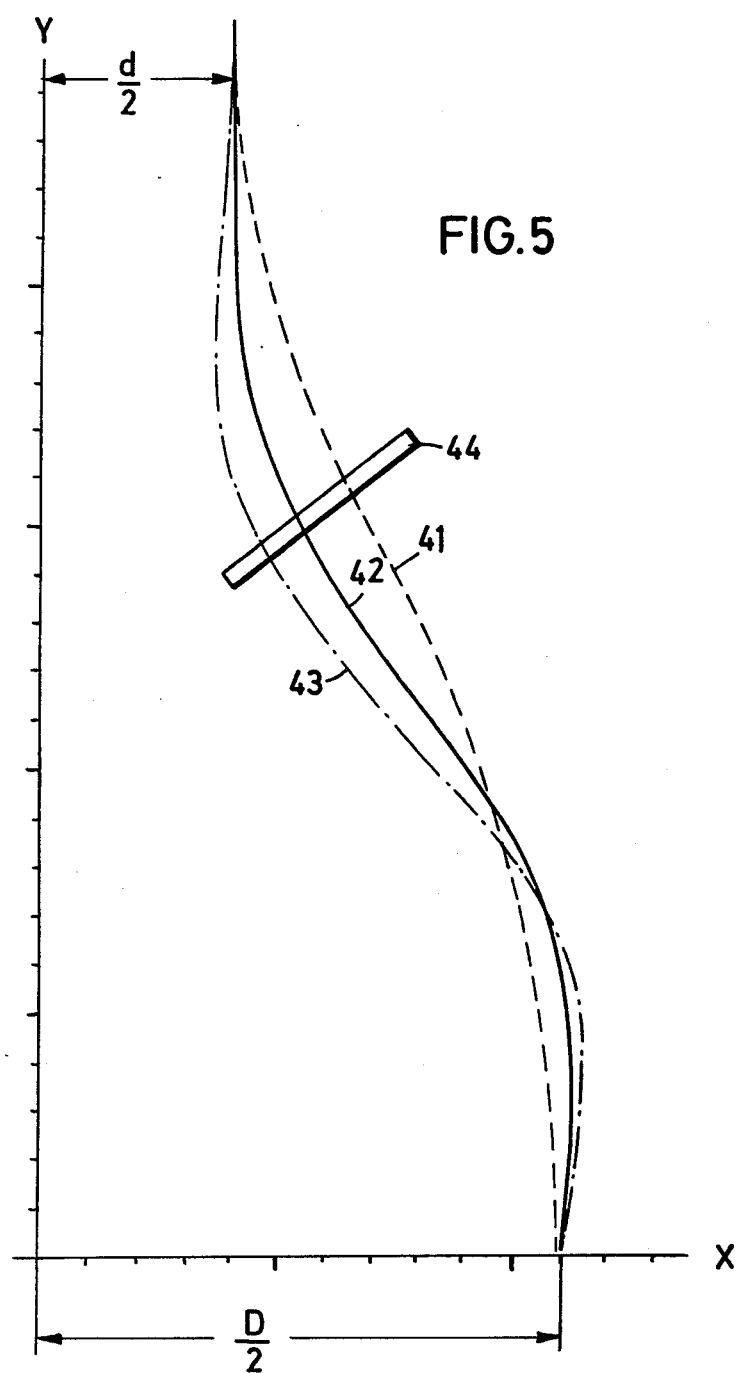

BLOWN FILM PROCESS

BACKGROUND OF THE INVENTION

1. Field of the Invention

The present invention relates to a blown film process and apparatus for making plastic film bags. The process comprises producing a film tubing by extrusion, and expanding the tubing by controlled internal and external excess pressure to obtain a film bag which expands increasingly from a smallest diameter at the extrusion die via a transition point to a maximum diameter established by a guide ring spaced from the die. Subsequently, the bags are flattened and rolled onto a drum.

2. Description of the Prior Art

A decisive problem in connection with blown film processes, in particular with the preparation of high molecular weight, low pressure polyethylene sheets, is the adjustment and maintenance of stable process conditions. The quality and uniformity of the produced film is dictated, for instance, by the selection and composition of the catalyst components, the polymerization medium, the pressure, temperature and extrusion speed parameters, and by the constructional design of the extruder and its die. Only a limited range of suitable values for these parameters will result in stable operating conditions. This acceptable tolerance range often is exceeded in practice, particularly in the preparation of paper-like sheets of high molecular weight, low pressure polyethylene. Thus during the manufacture of such sheets, frequent machine down time is experienced, or a low quality product is produced.

These difficulties are due, inter alia, to the following reasons:

1. A knowledge of the temperature and/or pressure of the extruder die itself is not sufficient to characterize the behavior of the melt during inflation after leaving the extruder die. Thus control of these extruder parameters does not guarantee that the extruded plastic tubing will undergo uniform inflation with time, even for a specific material quality.

2. It is not possible conclusively to determine the viscosity of the melt from its temperature.

3. In a production process, the amount and temperature of cooling air not only establishes the rate at which heat is removed from the surface of the sheet bubble, but also, in the preparation of paper-like sheets, greatly influences the similarity to paper, the variation of the wall thickness, and the resistance to expansion of the sheet in both longitudinal and transverse directions.

4. Even with a constant extruder output and a constant sheet take-off rate, the weight per square meter of the produced sheets, and accordingly, the wall thickness, are not necessarily constant. This is due to the fact that even small changes in temperature at the intake region of the extruder may result in substantial variation in the amount of extruder output.

5. In typical prior art systems the width of the flattened sheet or bag is measured just before winding onto the drum. This width measurement, however, does not lend itself to use as a control input for adjusting the process parameters, because the transit time from the extruder to the winding device is too long. The process parameters which caused the measured width variation may already have so exceeded the acceptable tolerance that correction is difficult or impossible.

6. Even to this date, there is insufficient knowledge about the relationship between the properties of the raw material and the resultant conditions prevailing during manufacture so as to be able to stabilize or control the production process and the quality of the produced sheet as a function of the raw material characteristics. The result found for a specific raw material cannot be transferred to form the basis for calculations with respect to other raw materials.

It is an object of the invention, in connection with a known blown film process, to control the conditions resulting in stability of the produced film bag so as to timely counteract an imminent impairment of the film quality by appropriate measures. It is also an object of the invention to establish the most favorable process parameters for different machines and/or melt materials by observing and controlling the shape of the film bag being formed.

SUMMARY OF THE INVENTION

In accordance with the present invention, these and other objectives are achieved by monitoring the width of the film bag being formed at a first measuring point situated between the concave-to-convex transition site of the bag and the site of maximum diameter, and controlling process parameters in response thereto.

The invention relies on the idea that the proper selection of process parameters will result by maintaining an optimum shape of the film bag being formed. If this shape is achieved, stable operation results, thus ensuring uniform and reproducible film preparation. In this connection, it is important to keep in mind that any parameter change which results in an impairment of the film quality will significantly influence the shape of the produced film bag. In accordance with the present invention, variations in the generated film bag are observed in a region near the extruder, so that adjustment can be effected immediately, whereby any further deviation of the film bag from its optimum shape is counteracted. Furthermore, and of particular importance in the present invention, the diameter of the bag is monitored in the region between the concave-to-convex transition site and the guide ring which defines the bag's ultimate size. Compensation is immediately provided for any shape variation at this measuring location, thereby enhancing the uniformity of the resultant product.

A detrimental process condition which frequently occurs is a decrease in the bag internal pressure. In such instance, the bag diameter is primarily reduced in the region between the transition point and the site of maximum diameter. In accordance with the present invention, if such a change is detected, the amount of blown air can be increased quickly to compensate for the adverse condition.

The diameter of the film bag as a function of distance from the extruder die follows a rather good approximation of a third order equation having two maxima and one reversing or transition point. The regions between the upper maximum and the reversing point, and the region between the lower maximum and the reversing point are very sensitive to changes in process parameters. Thus the deviation of the bag shape from the ideal curve gives information about imminent instability in the manufacturing process.

In one advantageous embodiment of the invention, the amount of cooling air blown from the outside against the film tubing is controlled in response to the width of the film bag, which is measured at a second measuring site between the extruder die and the transition point. The amount of supplied external cooling air is of significant importance to the proper operation of the process. It must be adjusted carefully, since its influence on the shape of the film bag is frequently non-linear.

The invention also relates to a film blowing device having an annular extruder die provided with a blow air inlet, at least one guide ring positioned at a distance from the die so as to fix the ultimate size of the film bag, and a flattening and take-off device situated beyond this ring. A scanning device for surveying the radial expansion of the film bag and/or the distance of a certain point P (FIG. 2) from the die, is mounted at the first measuring station between the transition point of the film bag and the site of maximum diameter. The scanning device should not itself have any influence on the shape of the film bag. Preferably, therefore, the scanning device comprises an optical scanner having one or more light barriers.

BRIEF DESCRIPTION OF THE DRAWINGS

A detailed description of the invention will be made with reference to the accompanying drawings wherein:

FIG. 5 is a set of curves illustrating the use of external cooling air, controlled in response to the output of a photo-cell bank at the second measuring station, to control the bag shape.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
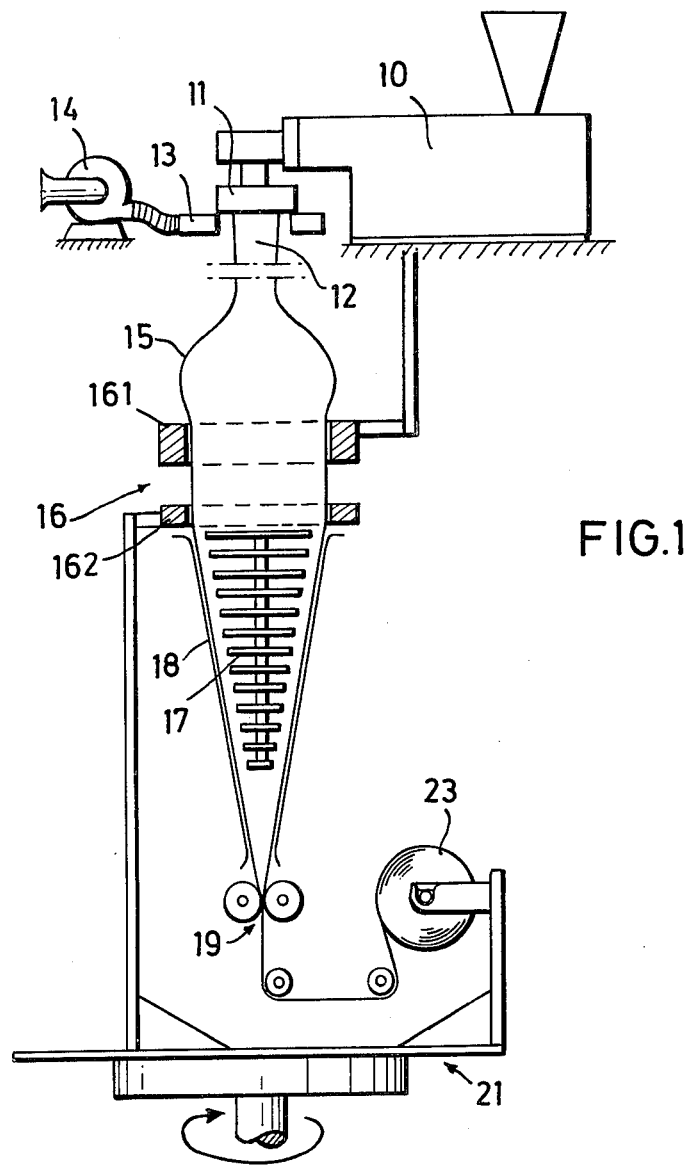
FIG. 1 is a schematic view of an apparatus in accordance with the present invention for producing blown film bags.

Referring to FIG. 1, the melt material from which the film bags are blown is introduced into an extruder 10 containing an extruder screw and a heating means (not shown). The extruder 10 supplies the melt to a blow head 11 which contains an annular die from which a film tubing 12 continuously is discharged. Supporting air is fed into the tubing 12 through the center of the annular die in the blow head 11. The blow head 11 is surrounded by a cooling ring 13 to which cooling air is supplied from a blower 14. This cooling air is blown against the outside of the tubing 12. As described below, the supply of supporting air to the interior of the tubing 12, and the supply of external cooling air from the blower 14 are controlled dynamically in response to measured shape parameters of the film tubing 12 as it is expanded to form the bag.

As the tubing 12 moves away from the annular die, the supporting air supplied through the blow head 11 expands the tubing 12 to form the bag 15. In the expansion region below the blow head 11, the diameter of the bag 15 may be expanded to from twice to four times the diameter of the tubing 12 emerging from the die itself.

Below the expansion region, the bag 15 travels through a guide means 16 consisting of two guide rings 161 and 162 which establish the final size of the bag. The guide ring 161 nearest the extruder die has a length which is greater than that of the subsequent guide ring 162. After passing through the guide means 16, the bag is flattened by means of lateral guides 17, 18 diverging and converging in the direction of travel of the film. These cooperate to conduct the tubing to a pair of squeeze rollers 19. The collapsed tubing subsequently is wound about a drum 23. The support ring 162, the lateral guides 17, 18, the squeeze roller pair 19 and the winding drum 23 are all mounted on a rotatable table 21 which rotates slowly about a vertical axis that is substantially coaxial with the annular extruder die. Appropriate means, not shown, may be situated between the rollers 19 and the drum 23 to heat seal the flattened tubing at spaced locations to define separate bags, and to provide serrations which facilitate later separation of these bags for individual use.

Figure 2:
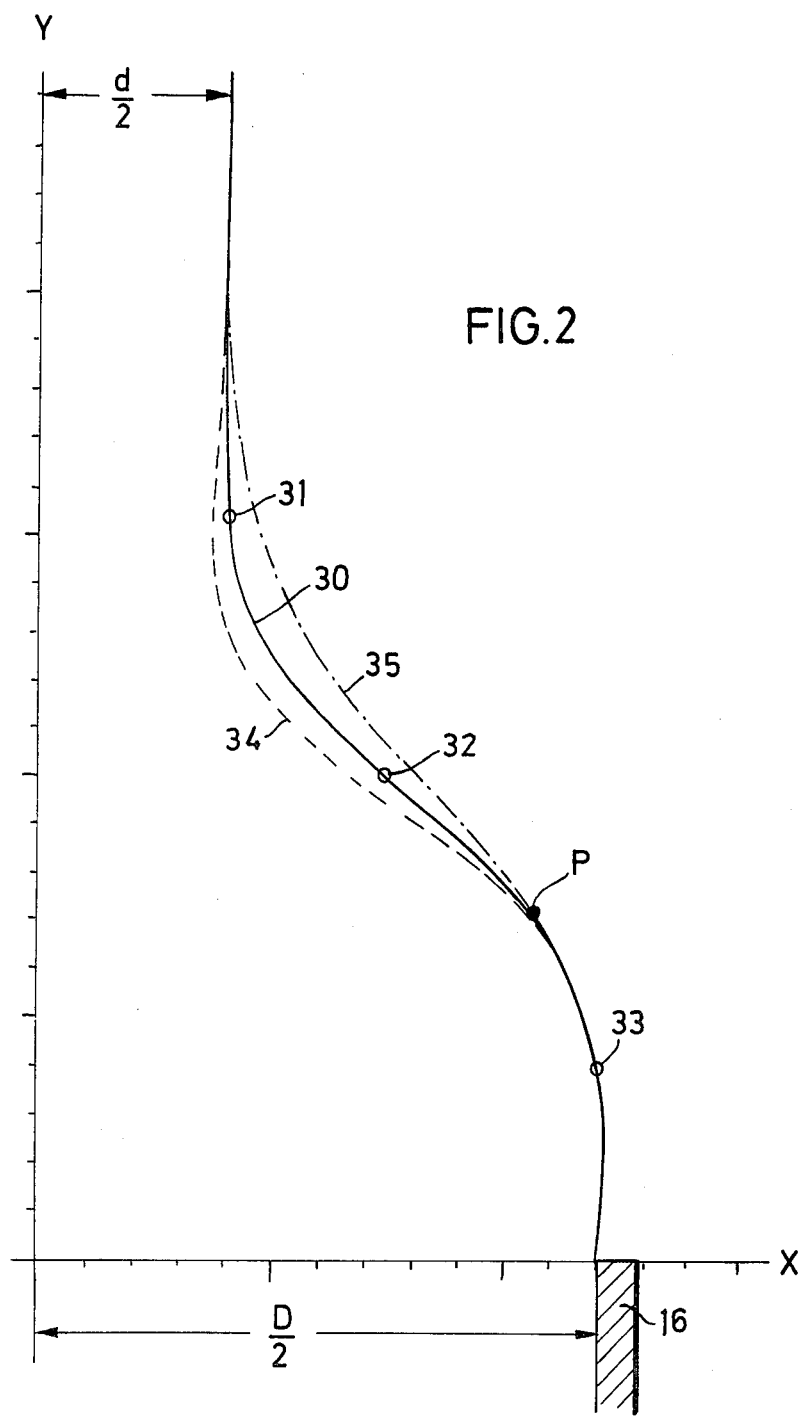
FIG. 2 is a set of curves illustrating the shape of the film bag being produced by the apparatus of FIG. 1.

The curves of FIG. 2 show some possible shapes which the film bag may assume as it is expanded in the region between the extruder die and the guide means 16. These different shapes can result from changes in individual parameters, such as the amount of supporting air which is supplied via the blow head 11, as described below.

Referring to FIG. 2, the solid curve 30 illustrates a film shape which begins at a minimum diameter 31 substantially equal to the diameter d of the extruder die. With increasing distance from the extruder die, the diameter increases through a concave region to a turning or transition point 32, after which the diameter continues to increase along a convex curve, until the maximum diameter point 33 is reached. Thereafter, the bag diameter decreases slightly before entering the upper guide ring 161 of the guide means 16. At this point, the bag has a diameter D equal to the diameter of the guide means 16. The guide means 16 thus fixes the bag diameter.

Tests have shown that the resistance of the film to expansion or tearing in the transverse direction is better when the bags are formed using the contour indicated by the numeral 34 (FIG. 2) than with the shape of the curve 35. The curve 34 has a somewhat more distinct minimum value while the maximum diameter 33 is about the same as with the curve 30. Very poor film resistance in transverse directions results when the extruded bag assumes the shape of the curve 35, which curve does not have a characteristic minimum value. Unstable film characteristics resulted when a bag shape corresponding to the curve 30 was used. The formation of such a bag shape thus is undesirable.

In the illustrations of FIG. 2, the curves have been drafted in a coordinate system in which the X-axis corresponds to the plane at the top of the guide ring 161 while the Y-axis corresponds with the axis of symmetry of the tubing 12 or of the film bag 15. Thus the Y-axis also corresponds to the axis of the annular extruder die.

The shape of projection of the bag illustrated in FIG. 2 corresponds with a good approximation to an equation of the third order. The following limits are applicable to the minimum value $E_i$ and the maximum value $E_a$:

$$E_i : \left[ x < \frac{d}{2} ; \frac{D}{2} < y < 2D \right]$$

$$\text{for } \frac{1}{2} < \frac{d}{D} < \frac{1}{4}.$$

$$E_a : \left[ \frac{D}{2} \leq x ; y < D \right]$$

Figure 3:
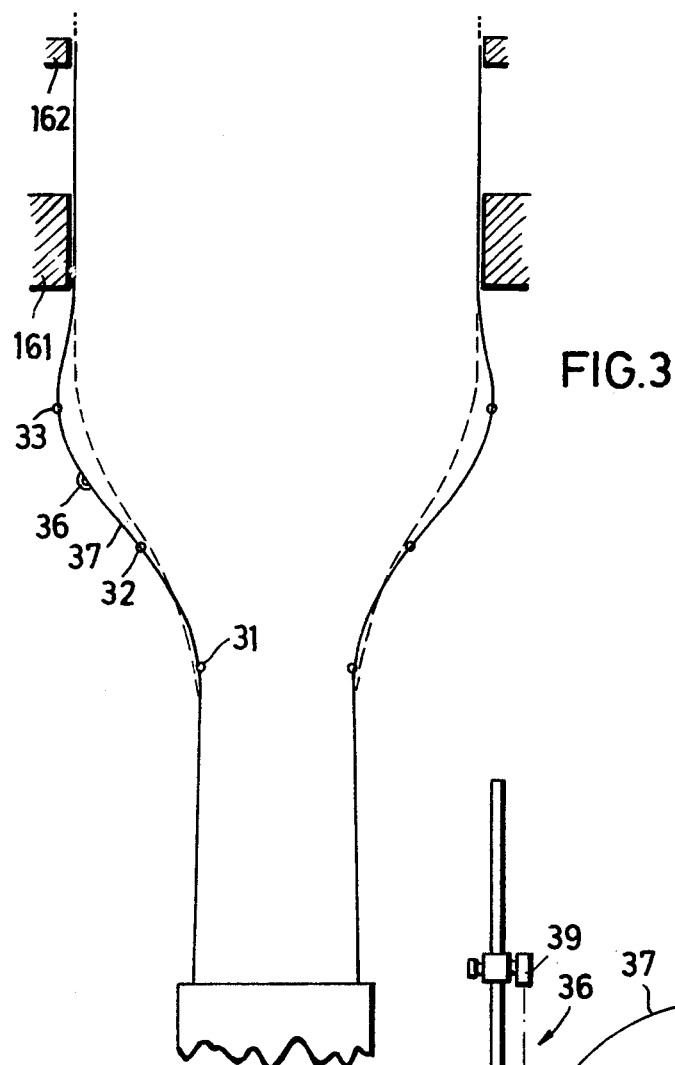
FIG. 3 schematically illustrates the use of a light barrier with an adjusting device to maintain the preferred bag width by controlling the amount of air blown into the bag.
Figure 4:
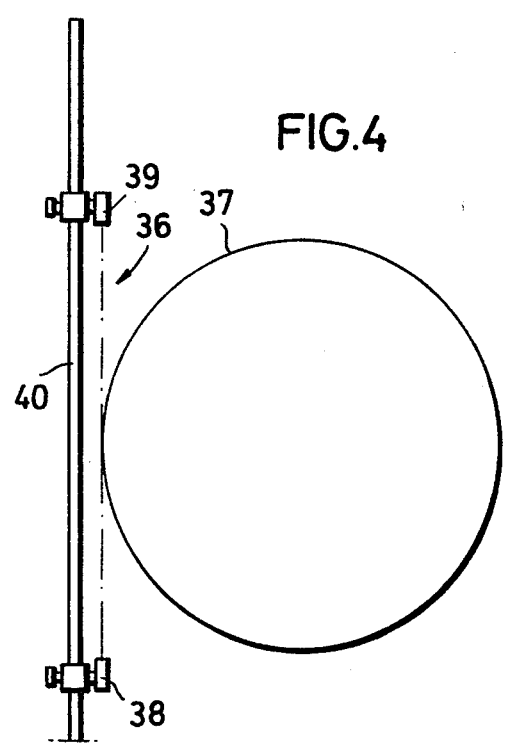
FIG. 4 is a schematic diagram showing the construction of the light barrier utilized in the arrangement of FIG. 3.

In the embodiment of FIGS. 3 and 4 a scanning device consisting of a light barrier 36 is mounted in the region between the turning or transition point 32 and the point 33 of maximum diameter. The position of the light barrier 36 is established experimentally. That is, different process parameters are adjusted so that a stable film bag having a good quality film will be produced. The contour of the bag with these optimized process parameters is indicated by the line 37 in FIG. 3. The light barrier 36 then is so situated that the light beam emanating from the light source 38 and directed to a photosensor 39 is just interrupted by the film bag. With this condition, no readjustment of the process parameters is necessary.

If air losses should occur at the squeeze rollers 19, or at the air feed line, or through the material of the film bag, the diameter of the film bag will become smaller. As a result, the path of the light barrier 36 will no longer be interrupted by the film bag, and the photosensor 39 will produce a control signal. This signal is used to operate a relay and a magnetic valve with throttle, known per se, which operates to add a controlled amount of support air through the blow head 11 into the interior of the tubing 12. This introduced air reestablishes the desired film shape.

With very thin films having a thickness on the order of from 0.010 to 0.015 mm, small defects may occur which require the supply of additional supporting air. Should the shape of the film bag change due to such escape of air, the tube 12 and bag 15 may collapse, resulting in an interruption of the production process. This situation is quickly and reliably avoided by using the control device of the present invention.

Advantageously, the light source 38 and the photosensor 39 may be fitted to a rail 40 (FIG. 4) which is adjustably mounted. Once the optimum film bag shape is achieved, the position of the rail 40 may be adjusted so that the bag just interrupts the light barrier 36, as described above.

During film preparation in the blowing process, the film thickness may vary slightly around the perimeter of the tubing 12, as a result of irregularities in the extruder die. To avoid piling of the thicker areas when the resultant bags are wound onto the drum 23, the lower guide ring 162, the flattening guides 17, 18, the rollers 19 and the drum 23 all are slowly rotated with respect to the extruder die. This may be accomplished either by providing a rotatable table 21 to support these members, as shown in FIG. 1, or alternatively by holding these members stationary and rotating the extruder and associated device components. If such a rotating system is used, the light barrier 36 (FIG. 4) should be stationary relative to the extrusion die. If a rotating extrusion die is employed, the light barrier should circulate concomitantly.

As discussed above, the guide means 16 establishes the bag diameter. Preferably, the guide ring 161 which is nearer to the extruder die should be mounted to remain stationary with respect to that die. The other, shorter guide ring 162, advantageously is affixed to the flattening and rolling mechanism so as to rotate therewith (as illustrated in FIG. 1). With this arrangement, defects in the film which occur in the region of the flattening and winding mechanism 17, 18, 23 will be isolated from, and not have any influence on the region of the bag 15 adjacent the light barrier 36. The guide rings 161, 162 may be adjustable iris diaphragms. If necessary, additional rings may be arranged in series.

FIG. 5 is a view similar to that of FIG. 2, but showing the influence on the film bag shape resulting from changes in the amount of cooling air blown externally against the film bag through the cooling ring 13. When little or no external cooling air is provided, the bag may assume the shape 41 illustrated by the dashed line in FIG. 5. This shape lacks a characteristic minimum diameter, and corresponds generally to the undesirable shape 35 discussed above in connection with FIG. 2.

As the amount of cooling air is increased, the bag assumed a shape illustrated by the solid line 42 in FIG. 5. This shape has a smaller diameter than the curve 41 in the initial region just below the extruder die, and has a more characteristic maximum region than does the curve 41.

With a further increase in the amount of external air provided via the cooling ring 13, the bag shape illustrated by the dash-dotted curve 43 was formed. This curve has minimum and maximum values which are still more distinct as compared with the curve 42. The curve 43 generally corresponds to the preferred curve shape 34 of FIG. 2. With still further increase in the amount of air, the bag shape reverted back to that of the curve 42. Thus the tests indicate that a change in the quantity of cooling air does not always entail a change in the bag shape in the same direction. As indicated, when the cooling air quantity is increased beyond a certain value, the minimum diameter may actually be enlarged rather than decreased.

To optimize the shape of the film bag in the region between the extruder die and the transition point 32, a bank or band 44 of photosensors may be placed in the region between the transition point and the location of the minimum tube diameter, as illustrated in FIG. 5. Advantageously, the band 44 is situated approximately at a right angle to the preferred curvature of the bag.

Advantageously, the bag will interrupt the light path to some but not all of the photosensors in the bank 44. Thus, as the shape of the tubing changes, so that the minimum diameter value either increases or decreases, fewer or more of the light paths to the photosensors in the bank 44 will be interrupted. Appropriate circuitry (not shown but known per se) then can determine from the photosensor output whether an increase or reduction in the film bag diameter has occured. The amount of cooling air provided via the cooling ring 13 then may be controlled in response to the photosensor output so as to stabilize the bag shape along a preferred curvature. In general, changes in the amount of cooling air are required when the room temperature changes.

Only some examples showing the influence of different process parameters have been described above. Basically, each change in the shape of the film bag is detected according to the process of the invention, and the control of a suitable process parameter is performed in response thereto. All measurable factors of pressure, temperature, amount and time can be related to the various shapes shown in FIGS. 2 and 5. The data may be correlated with values obtained by investigation of the raw materials used and of the final films produced. The present invention is not limited to varying the supporting air or the amount of cooling air supplied to the bag being formed. In general, any process parameter may be varied dynamically in response to detected changes in the shape of the film bag, with the objective of maintaining a curvature that approximates an equation of the third order.

In addition to its usefulness in the dynamic control of the actual blowing process, the present invention also is suitable for use in the selection of raw material. Using the invention, it may be found that certain raw materials result in films which are easier to maintain in the desired curvature than films formed from different raw material. Another field of application includes the development of new types of raw material in connection with which the inventive process aids in obtaining film bags and sheets of desirable, reproducible quality.

By use of machines and apparatus employing the inventive process, optimum plant output can be obtained with minimum down time of the manufacturing equipment.

I claim:

1. In a blown film process for making plastic film bags and the like by extruding a film tubing and expanding the tubing by the application of internal excess pressure so as to obtain a film bag which increases in diameter from a smallest diameter via a turning or transition point to a maximum diameter, and which is subsequently flattened, the improvement comprising:

controlling the diameter of the film tubing at a first measuring station located between the turning point site and the site of maximum diameter.

2. A blown film process according to claim 1 wherein said controlling comprises:

regulating the amount of air blown into the interior of said film tubing to produce said internal excess pressure in response to the diameter of said film tubing as determined at said first measuring station.

3. A blown film process according to claim 1, further comprising:

regulating the diameter of said film tubing at a second measuring station between the site of minimum diameter and the turning point site.

4. A blown film process according to claim 3 wherein said regulating comprises:

blowing cooling air externally against said film tubing, and adjusting the amount of such blown cooling air in response to the diameter of said film tubing as determined at said second measuring station.

5. A blown film process according to claim 3 further comprising:

providing first and second control signals indicative of the measured diameter of said film tubing at said first and second measuring stations respectively, and initiating switching actions to modify process parameters in response to inadmissible variations of said film tubing diameters as indicated by said first and second control signals, said modification thereby dynamically restoring said diameters to within admissible ranges.

6. A blown film process according to claim 5 wherein the diameters of said film tubing at said first and second measuring stations are respectively controlled and regulated by modification of process parameters so as to maintain the film tubing in the shape of a curve approximated by an equation of the third order.

7. A blown film apparatus for making plastic film bags and the like by extruding a film tubing and expanding the tubing by the application of internal excess pressure so as to obtain a film bag which increases in diameter from a smallest diameter via a turning or transition point to a maximum diameter, said apparatus including means for controlling the diameter of the film tubing at a first measuring station located between the turning point site and the site of maximum diameter, comprising:

an annular extrusion die having an inside air inlet therethrough, at least one guide ring arranged at a distance from the extrusion die for fixing the diameter of the film bag, a flattening and take-off device situated on the other side of said guide ring from said extrusion die, a scanning device situated at said first measuring station for monitoring the diameter of the film bag at said first measuring station, and means for blowing air into the interior of said film tubing through said inside air inlet so as to apply said internal excess pressure, said means for blowing being controlled in response to the output of said scanning device so as to maintain the diameter of said film tubing at said first measuring station at a substantially constant predetermined value.

8. A blown film apparatus according to claim 7 further comprising:

a second scanning device, situated at a second measuring station between the site of said smallest diameter and said turning point site, for monitoring the diameter of the film bag at said second measuring station.

9. A blown film apparatus according to claim 8 further comprising:

external air supply means for providing an annularly inward supply of air against the exterior surface of said film tubing at a location between said extrusion die and said turning point, the amount of air supplied by said external air supply means being controlled in response to the output of said second scanning device.

10. A blown film apparatus according to claim 7 wherein said flattening and take-off device is mounted for rotation with respect to said extrusion die, and wherein at least two mutually spaced guide rings are provided of which one is stationary with respect to said extrusion die and the other is stationary with respect to said flattening and take-off device, said one guide ring being longer than said other guide ring.

11. A blown film apparatus according to claim 10 wherein said guide rings consist of iris diaphragms.

12. A blown film apparatus according to claim 8 wherein said scanning device consists of a photosensor bank.

13. A blown film apparatus according to claim 12 wherein there is provided an assembly for detecting both expansion and reduction of the diameter of said film tubing in response to the output signals from said photosensor bank.

14. In an apparatus for the production of blown plastic film tubing, said apparatus including an annular die through which said film tubing is extruded, and supporting air supply means for supplying air through said annular die to the interior of said tubing to cause lateral expansion thereof, wherein said extruded tubing increases in diameter from a site of smallest diameter via a turning or transition site to a site of maximum diameter, the improvement comprising:

first sensing means, situated at a first measuring station, for sensing the radial expansion of the tubing at a first location between the turning point site and the site of maximum diameter, and first control means for controlling the amount of air supplied by said supporting air supply means to the interior of said tubing in response to the output of said first sensing means so as to maintain the radius of said film tubing at said first measuring station at a fixed value.

15. An apparatus according to claim 14 further comprising:

annular cooling air supply means for providing cooling air to the exterior of said film tubing, second sensing means, situated at a second measuring station, for sensing the radial expansion of said tubing at a second location between the turning point site and the site of smallest diameter, and second control means for controlling the amount of cooling air provided by said annular cooling air supply means against the exterior of said film tubing in response to the output of said second sensing means so as to maintain the radius of said film tubing at said first station at a fixed value less than that at said second station.

16. An apparatus according to claim 15 wherein said first and second control means cooperate with said supporting air supply means and said annular cooling air supply means to maintain the profile of said film tubing in the shape of a curve approximate by a third order equation.

17. In an apparatus for the production of blown plastic film tubing, said apparatus including an annular die through which said film tubing is extruded, the improvement comprising:

first air supply means for supplying supporting air through said annular die to the interior of said film tubing, second air supply means for supplying cooling air to the exterior of said film tubing in an annular region thereof, and control means for monitoring the profile of said film tubing and for controlling said first and second air supply means so as to maintain the profile of said film tubing in the shape of a curve approximated by a third order equation.

18. An apparatus according to claim 17 further comprising a guide ring spaced from and coaxial with said extrusion die, said film tubing extending through said guide ring so that the maximum diameter of said film tubing is fixed thereby, said film profile including a concave region relatively nearer to said extrusion die and including a site of minimum diameter, a convex region relatively nearer to said guide ring and including a site of maximum diameter, and a transition site between said concave and convex regions, said second air supply means being situated between said extrusion die and said transition site, and wherein said control means includes first and second sensors respectively situated adjacent said convex and concave regions for detecting the diameters of said film tubing in said respective regions and for controlling said first and second air supply means in response thereto.

* * * * *